(12) United States Patent
Wehrle et al.

(10) Patent No.: US 7,412,530 B1
(45) Date of Patent: Aug. 12, 2008

(54) POINTBUS ARCHITECTURE AND AUTOMATIC SEQUENTIAL ADDRESSING PROTOCOL

(75) Inventors: David S. Wehrle, Chesterland, OH (US); Carl R. Schumaker, Chardon, OH (US); Gregg M. Sichner, Mentor, OH (US); John P. Caspers, Racine, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 120 days.

(21) Appl. No.: 10/929,838

(22) Filed: Aug. 30, 2004

Related U.S. Application Data

(63) Continuation of application No. 09/546,093, filed on Apr. 10, 2000, now Pat. No. 7,080,150, and a continuation of application No. 09/546,089, filed on Apr. 10, 2000, now Pat. No. 7,228,363.

(60) Provisional application No. 60/194,717, filed on Apr. 5, 2000.

(51) Int. Cl.
 *G06F 15/16* (2006.01)
(52) U.S. Cl. ............... 709/230; 709/225; 709/245; 710/10; 710/11; 370/230; 370/469
(58) Field of Classification Search ......... 709/225–230, 709/245–246, 250; 710/10–14; 370/230–231, 370/466–469
See application file for complete search history.

(56) References Cited

U.S. PATENT DOCUMENTS

| 5,416,908 | A | 5/1995 | DiCarlo et al. |
| 5,564,059 | A | 10/1996 | Maskovyak et al. |
| 5,675,740 | A | 10/1997 | Heimsoth et al. |
| 5,745,493 | A | 4/1998 | St. Clair |
| 5,745,708 | A | 4/1998 | Weppler et al. |
| 6,044,410 | A | 3/2000 | Maskovyak et al. |
| 6,052,382 | A * | 4/2000 | Burke et al. ............ 370/469 |
| 6,081,845 | A | 6/2000 | Kanemaki et al. |
| 6,128,673 | A | 10/2000 | Aronson et al. |
| 6,145,003 | A | 11/2000 | Sanu et al. |
| 6,148,344 | A | 11/2000 | Bi |
| 6,151,640 | A * | 11/2000 | Buda et al. ............. 710/11 |
| 6,181,710 | B1 | 1/2001 | Cooper et al. |
| 6,185,197 | B1 | 2/2001 | Yeung et al. |
| 6,253,268 | B1 | 6/2001 | Bjorkengren et al. |
| 6,301,632 | B1 | 10/2001 | Jaramillo |
| 6,484,206 | B2 * | 11/2002 | Crump et al. ............ 709/227 |
| 6,484,216 | B1 * | 11/2002 | Zegelin ................ 710/11 |
| 6,487,218 | B1 | 11/2002 | Ludwig et al. |
| 6,724,724 | B1 | 4/2004 | Swenson et al. |
| 6,907,395 | B1 * | 6/2005 | Hunt et al. ............. 709/226 |
| 6,985,901 | B1 * | 1/2006 | Sachse et al. ............ 707/10 |

\* cited by examiner

*Primary Examiner*—Bharat N Barot
(74) *Attorney, Agent, or Firm*—Amin Turocy & Calvin; R. Scott Speroff

(57) ABSTRACT

A protocol for configuring I/O devices is provided in accordance with the present invention. The protocol includes a first protocol for enabling at least one I/O module to receive network communications, and a second protocol for providing the network communications to the at least one I/O module. The first protocol enables at least one I/O module to enable at least one other I/O module to form an I/O group.

19 Claims, 9 Drawing Sheets

US 7,412,530 B1

POINTBUS ARCHITECTURE AND AUTOMATIC SEQUENTIAL ADDRESSING PROTOCOL

CROSS REFERENCE TO RELATED APPLICATIONS

This application is a continuation of U.S. Ser. No. 09/546,093, filed Apr. 10, 2000, and entitled POINTBUS ARCHITECTURE AND AUTOMATIC SEQUENTIAL ADDRESSING PROTOCOL. This application is also a continuation of U.S. Ser. No. 09/546,089, filed Apr. 10, 2000 and entitled POINTBUS ARCHITECTURE AND AUTOMATIC SEQUENTIAL ADDRESSING, which claims priority to U.S. Provisional Application 60/194,717, filed Apr. 5, 2000 and entitled POINTBUS ARCHITECTURE AND AUTOMATIC SEQUENTIAL ADDRESSING. The entireties of these applications are incorporated herein by reference.

TECHNICAL FIELD

The present invention relates generally to control systems, and more particularly to a system and method for providing a sequentially adaptable control system thereby mitigating system costs and configuration requirements.

BACKGROUND OF THE INVENTION

Control systems are at the core of modern manufacturing. These systems control diverse processes from steel and automotive products to mass distribution products associated with food and beverages, for example. In general, control systems require a processor and related program to direct a related system of Input/Output (I/O) interfaces (e.g., I/O modules) which in turn report and control industrial processes. I/O modules may be selected to perform digital style (e.g., 120V input/output) and/or analog style control (e.g., 4-20 ma input/output), for example. Also, generally associated with control systems are related racks, power supplies and control networks for housing, powering, and communicating with the associated I/O modules.

Over time, industrial system demands have steadily increased. For example, system demands for lower costs and increased flexibility are increasingly necessary for modern factories to compete on the global stage. Lower system costs provide manufacturers with a competitive advantage by realizing a better return on capital investments. Flexibility enables a manufacturer to respond to changing market dynamics as product and sales requirements change. Unfortunately, conventional systems many times are burdensome to install/upgrade and often require manufacturer's to install more system components than necessary. Thus, conventional systems generally do not provide the requisite flexibility and associated lower costs required by modern systems.

As an example of some of the problems associated with conventional systems, consider an initial system design requiring "X" number of associated I/O points. Often times, in order to minimize system costs, I/O points are selected for the smallest possible grouping to control a process. This grouping may likely include a rack to house the I/O, an interface module (e.g., communications/control module) to control and interact with the I/O, and associated power supply to power the system. If the system were designed initially to provide future expansion, empty rack positions and/or additional rack/power/interface components may then need to be maintained in order to provide for future system requirements. If the system were designed only for initial I/O requirements, additional racks, power supplies and interface modules are likely to be added to accommodate future requirements. In either case, system costs are initially higher to account for future expansion requirements, and/or higher in the future to add system requirements. Consequently, conventional systems generally require either higher initial and/or future costs in order to provide ever changing system capabilities.

Another problem associated with conventional systems is related to configuration requirements. Often, when systems are initially installed and/or upgraded, significant configurations are required to add additional I/O groupings. These requirements may include adding a rack number (e.g., number of a network adapter) to a network list, defining additional I/O requirements, programming additional memory to receive the I/O and potentially setting switches related thereto. Furthermore, system wiring such as communications and power cables generally increase. These additional steps will likely increase system installation and maintenance costs.

Due to cost and flexibility issues associated with conventional control systems, there is a strong need in the art for an improved system for mitigating system costs and providing a flexible and economical system for future expansion requirements.

SUMMARY OF THE INVENTION

The present invention relates to an improved system and method for providing a flexible and lower cost control system. Lower system costs and flexibility are provided by a sequentially adaptable system of associated modules wherein I/O may be incrementally added to a system. Sequential adaptability enables modules to communicate over a standard network interface without the need for an associated I/O rack and/or additional communications modules thereby mitigating system costs. Flexibility, cost, and configuration requirements are improved by enabling a manufacturer to initially install a precise amount of I/O, and subsequently add related modules to an existing set of operatively coupled modules.

More specifically, the present invention provides a PointBus architecture and addressing protocol to enable systems to be grouped according to more precise I/O requirements and to enable systems to be incrementally expanded without substantially increasing system costs. For example, a system may initially include a grouping of associated I/O modules. An additional I/O module may be added to, and automatically become part of the initial grouping merely by being placed in relation to the existing module set (e.g., to the right of the existing set) and becoming operatively coupled thereto. This may be achieved, for example, by enabling modules to fixably attach to a previous module and subsequently establish network communications. Thus, additional rack and communications requirements are mitigated. Communications may be achieved by providing a network interface (e.g., DeviceNet, EtherNet, ControlNet etc.) to communicate with the I/O modules. A protocol in accordance with the present invention may then be provided to sequentially enable subsequent modules to communicate with the network interface upon becoming attached thereto.

As described above, modules may become part of the control system in a sequential manner. Under initial power conditions, a first module may become initialized for network operations by receiving an input in accordance with the protocol described above. After network communications have been established for the first module, an output from the first module enables a second module to become network operational. In this manner, modules may be sequentially added to a system as requirements change. Thus, systems may be designed for both present and/or future expansion requirements in economical manner.

In accordance with one aspect of the present invention relates to a protocol for automatic sequential addressing, comprising: a first protocol for enabling at least one I/O module to receive network communications; and a second protocol for providing the network communications to the at least one I/O module.

To the accomplishment of the foregoing and related ends, the invention then, comprises the features hereinafter fully described. The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
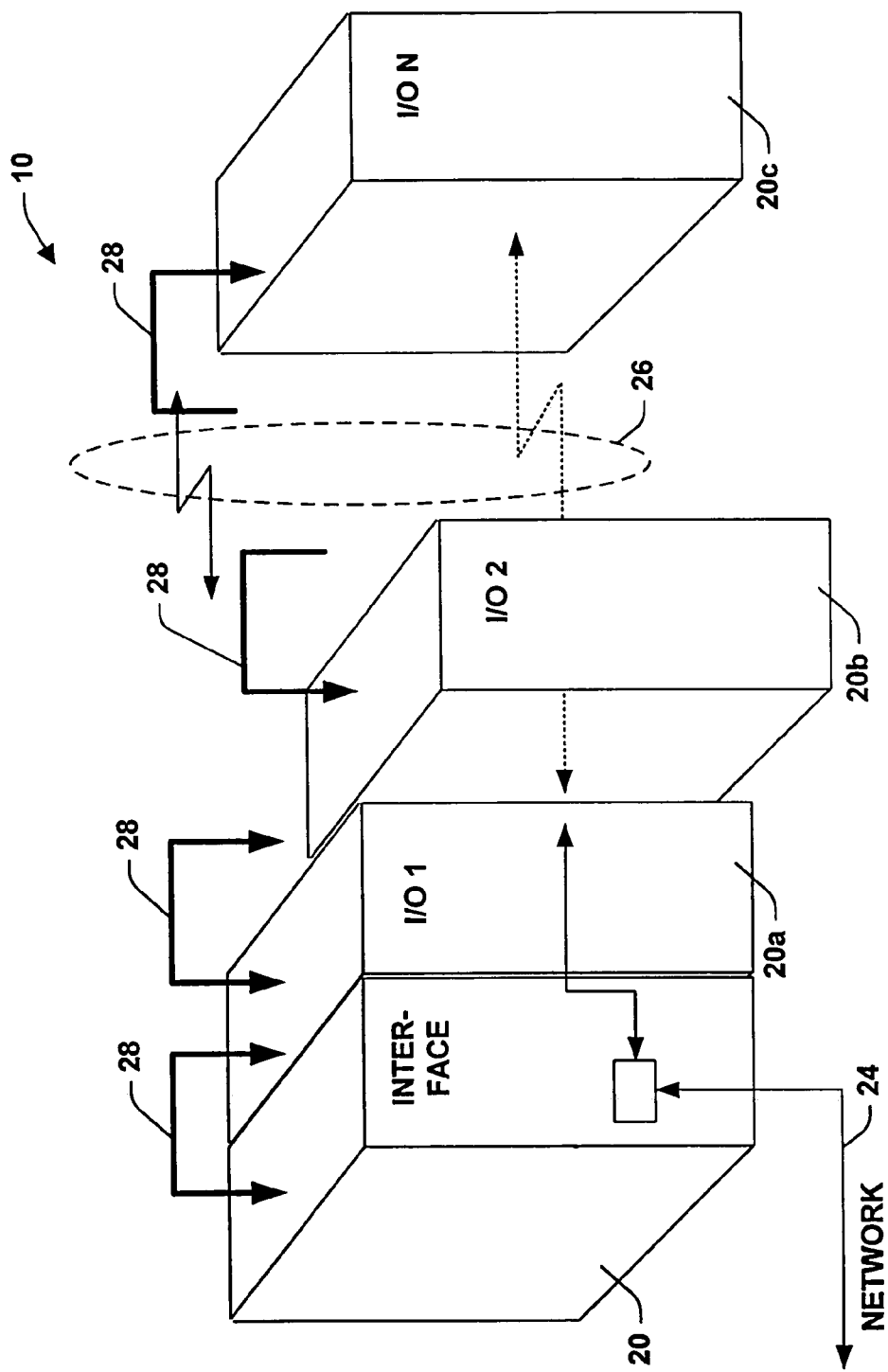
FIG. 1 is a schematic block diagram illustrating an adaptable control system in accordance with one aspect of the present invention.

The present invention is now described with reference to the drawings, wherein like reference numerals are used to refer to like elements throughout.

In accordance with the present invention, a system and method provides an improved control system to enable a user to build a precise I/O system while mitigating the need to add racks, communications, and power supplies. This provides the user with a more granular I/O system while reducing node connection costs when additional I/O points are desired. As will be described in more detail below, a PointBus interface provides for an adaptable system wherein a standard network interface may be employed to communicate and control individual modules.

Referring initially to FIG. 1, an exemplary system 10 illustrates an aspect of a sequentially adaptable system in accordance with the present invention. The system 10 may include an interface 20 for communicating with a network 24, and may include an adaptable number of I/O modules—I/O 1 through I/O N, (show as reference numerals 20a-20c) for example, for controlling system processes such as analog and discrete logic functions. A PointBus architecture 26, which may include the network connection 24 and a bus 28, enables modules to be sequentially powered and added to the system 10. In this manner flexibility is increased and costs are reduced over conventional systems by enabling a user to specify a precise amount of I/O and flexibly increase/decrease the system 10 if future changes are required.

As illustrated in FIG. 1, modules may be added to and/or removed from the system 10 by slidingly engaging a first module with an existing module to build a desired system. For example, a first system may include the interface 20, and at least one I/O module 20a. In accordance with the present invention, modules may be adapted to provide grooves (not shown) for cooperative interengagement with related appendages (not shown) whereby the grooves of a first module may cooperatively interengage with corresponding appendages of an adjacent module—this provides for a suitably stable interconnection. A second I/O system may include positioning a third I/O module 20b in relation to the I/O module 20a. This process may be repeated until a desired system has been determined which may include an Nth I/O module 20c (N being an integer). In this manner, a rack for positioning, powering and communicating to I/O modules is unnecessary.

After a desired module has been positioned, operative couplings are thereby established via the PointBus architecture 26. The PointBus 26 provides a system wherein modules may be sequentially enabled (e.g., from left to right) from an adjacent module. For example, module 20a may be enabled from the interface 20. Module 20b may then be subsequently enabled via module 20b and so forth. As will be described in more detail below, the bus 28 establishes automatic sequential addressing in accordance with the present invention wherein each module may first become configured on the network 24 and then subsequently enable a succeeding module to become network operational.

The PointBus architecture 26 utilizes a communication system 24 (e.g., DeviceNet, ControlNet) that may be employed to provide the exchange of data and messages between the interface 20 and I/O modules adapted thereto. The architecture 26 may also include: a physical media such as a printed circuit board within the I/O modules with associated copper tracework; metal connectors for PointBus communication between modules; field power distribution; data that may consist of embedded DeviceNet messages and services per Layers 1, 2 and 7 of the ODVA (Open DeviceNet Vendors Association) specification; a modification of the CAN (e.g., DeviceNet specific signals) Physical Signaling Layer to provide sequential addressing for modules to communicate with each other; and a set of Point I/O specific messages and services, described below. It is to be appreciated that although DeviceNet may be employed to provide system communications 24, other communications systems such as EtherNet and/or ControlNet, for example, may be suitably adapted.

Figure 2A:
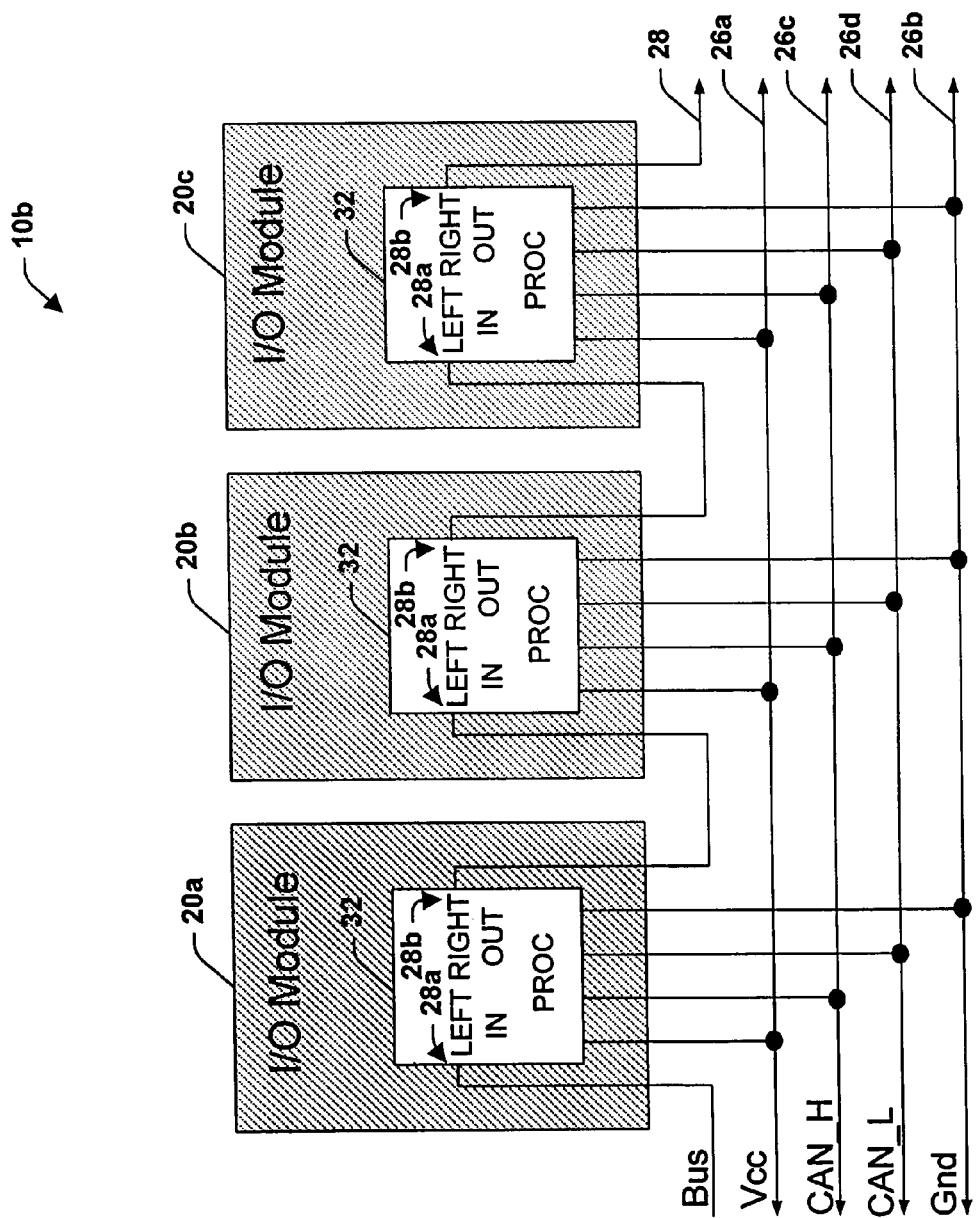
FIG. 2a is a schematic block diagram illustrating an I/O module group in an adaptable control system in accordance with one aspect of the present invention.

Referring now to FIG. 2a, a system 10b illustrates an exemplary PointBus architecture 26 in accordance with the present invention. The PointBus architecture 26 may consist of a plurality of signals, for example—two for system power, three for communications and two for field power. The signals may include: a Vcc 26a, a ground 26b, a CAN_H 26c, and CAN_L 26*d*, the bus 28, and a V+ 26*e* and COMMON 26*f* for supplying field power to I/O modules.

The Vcc 26*a* and Ground 26*b* may supply power for the digital circuitry on associated I/O modules 20*a*-20*c*, and the voltage may be a regulated 5 volts at 1 A, for example. The CAN_H 26*c* and CAN_L 26*d* may be connected to a DeviceNet transceiver chip, for example, (not shown) in each I/O module. The bus 28, as shown in FIG. 2*a*, may be a daisy chained signal that facilitates the sequential order of module addresses as well as provide a mechanism to enable modules to exchange PointBus messages between modules as will be described in more detail below.

The bus 28 may function as an input line from a connector (not shown) found on the left side of the I/O modules 20*a*-20*c*, and as an output line to a connector (not shown) on the right side of the modules. Messages may be passed sequentially from left to right, and it is generally assumed that the when a message is received by a module via the bus 28 that the signal originated from the module to the left.

In accordance with the present invention, the bus 28 may enable a single module at a time to communicate on the PointBus 26 during initial power up. When a module 20*a*-20*c* powers up, it may assert (e.g., pull high) a serial output (e.g., right) line 28*b*. When a serial input (e.g. left) line 28*a* goes low, a module 20*a*-20*c* may be enabled to begin the process of obtaining a Node Address on the PointBus 26. This may occur for example, when a module has successfully passed a Duplicate MAC ID check (e.g., DeviceNet command), thereafter, the module may then pull its output line 28*b* low. At power up, a module may assert its output line 28*b* as soon as possible. It then may wait about 1 second before examining its serial input line 28*a*. If the serial line 28*a* is asserted high, there is an adjacent module (to the left) that is being configured.

The Field Power Bus 32, as described above, may consist of two conductors (+V 26*e* and COMMON 26*f*) with the following ratings:

|  | Voltage Range | Current |
|---|---|---|
| DC | 5 to 125 Vdc | 10 A |
| AC | 24 to 240 Vac | 10 A |

It is to be appreciated that other ratings may be selected.

I/O modules 20*a*-20*c* may support the DeviceNet Specification for layers 1, 2 and 7 (except for the Physical Layer), for example, and modules on PointBus architecture 26 may operate as a single DeviceNet node. It is to be appreciated that the I/O modules 20*a*-20*c* may include a processor 32 adapted to communicate with the PointBus architecture 26. The processor 30 may be configured via an EEPROM (not shown), for example, and may include various other support circuitry such as RAM, timers and counters as is well understood in the art.

Figure 2B:
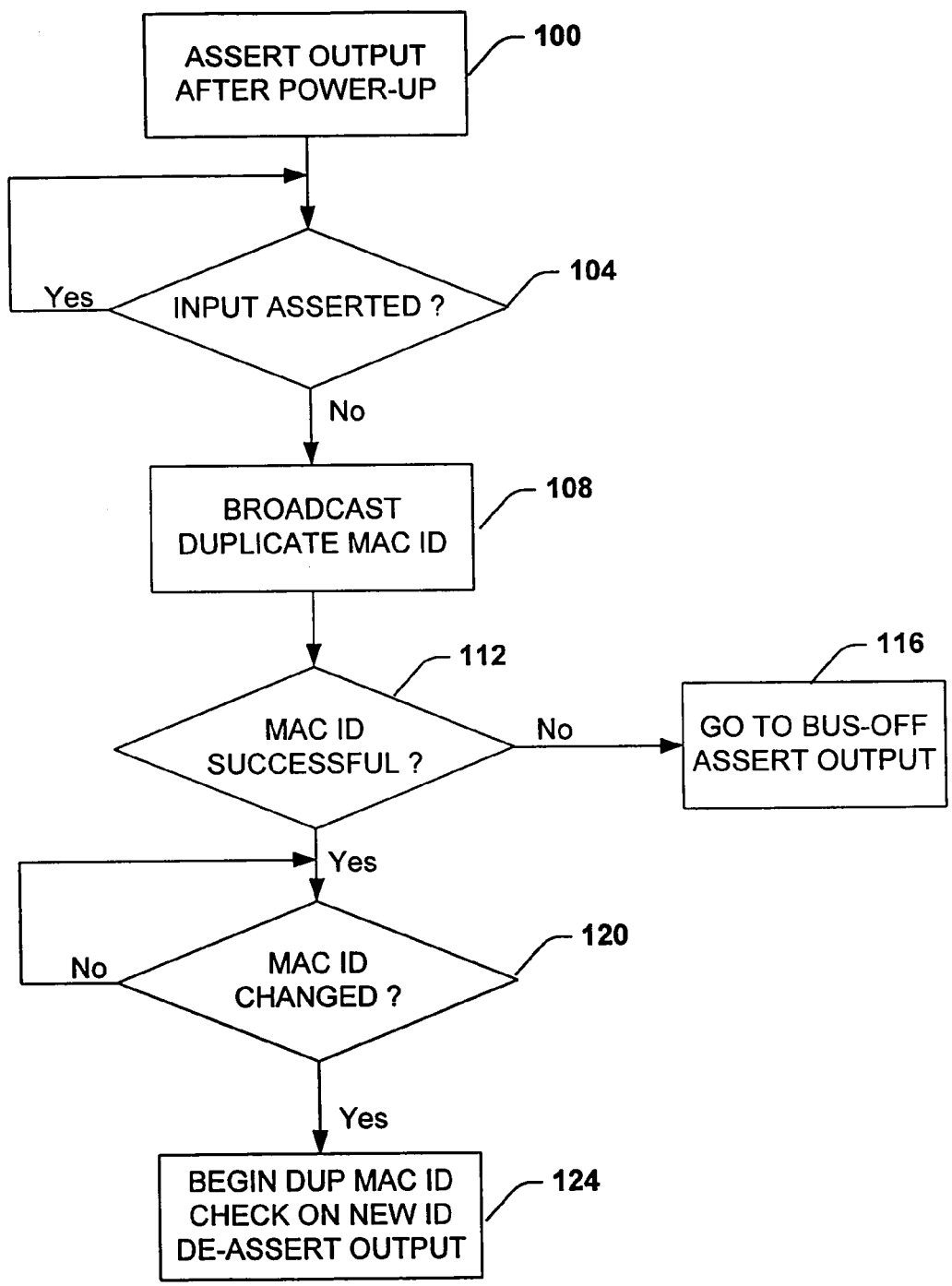
FIG. 2b is a flow chart diagram illustrating a methodology for an adaptable control system in accordance with one aspect of the present invention.

Turning now to FIG. 2*b*, a power-up process of a new I/O module is shown and illustrates one aspect of the present invention. A 'new module' may be defined as a module that has never been configured with a DeviceNet address, for example. Modules may be initially programmed with a Node Address of 63, for example, at the time of manufacture. It is to be appreciated that other node addresses may also be employed.

At step 100, a module may assert its output line 28*b* within about 300 ms after power is applied. At step 104, and after about 1 second, the input line 28*a* may be examined to check if the input 28*a* is asserted. If the input 28*a* is asserted, the module continues in idle and unconfigured mode and returns to step 104. If the input 28*a* is not asserted the process proceeds to step 108.

At step 108, a Duplicate MAC ID broadcast is commenced. (e.g., Check Node 63).

At step 112, if the Duplicate MAC ID Check is not successful, the process proceeds to step 116 and remains in a bus-off condition, continues to assert the output 28*b* and may wait for Group 4 messages.

If the Duplicate MAC ID was successful at step 112, the process goes into a Standby State at step 120 and proceeds to Wait for MAC ID to be changed at step 120. If the MAC ID has changed at step 120, the process proceeds to step 124. If the MAC ID has not changed at step 120, the process proceeds back to step 120. At step 124, Duplicate MAC Check is performed on the new ID and the serial output 28*b* may be de-asserted. If Duplicate MAC ID is successful and no other configuration data are needed, the module becomes operational and may go to the on-line state on the PointBus 26.

Figure 2C:
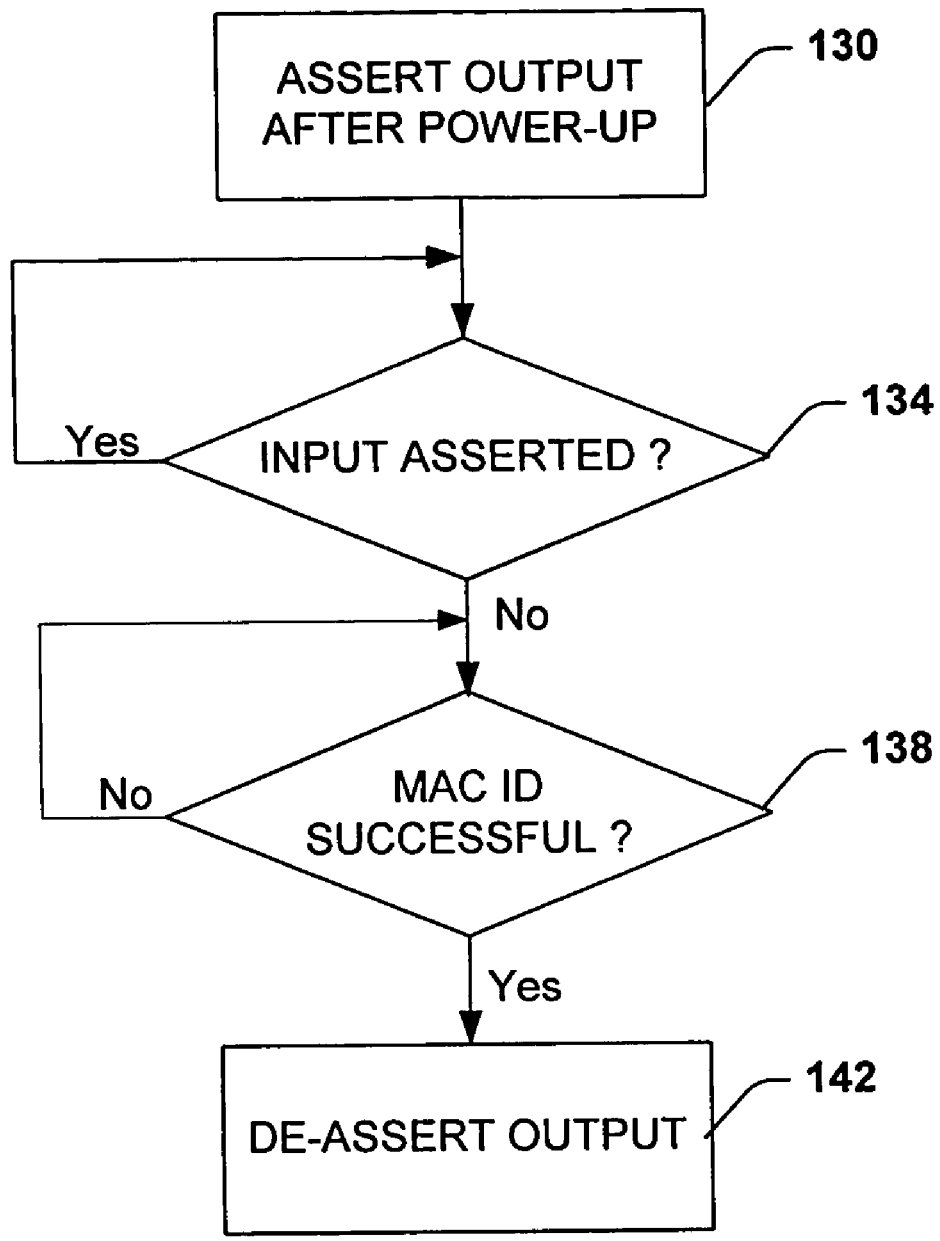
FIG. 2c is a flow chart diagram illustrating a methodology for an adaptable control system in accordance with one other aspect of the present invention.

Referring now to FIG. 2*c*, a power-up process for a pre-configured module illustrates another aspect of the present invention. A 'pre-configured module' may have a Node Address other than 63. The module may have been assigned an address at least one time and its node address is no longer 63, for example.

At step 130, a module may assert its output line 28*b* within about 300 ms after power is applied. At step 134, and after about 1 second, the input line 28*a* may be examined to check if the input 28*a* is asserted. If the input 28*a* is asserted, the module continues in idle and unconfigured mode and returns to step 134. If the input 28*a* is not asserted the process proceeds to step 138. At step 138, Duplicate MAC ID is checked for an assigned node (e.g., not 63). If the Duplicate MAC ID is not successful at step 138, the process proceeds back to step 138 to check for MAC ID. If the check was successful at step 138, the process proceeds to step 142. At step 142, output 28*b* is de-asserted. If Duplicate MAC ID was successful and no other configuration data are needed at step 142, the module may become operational and may go to the on-line state on the PointBus 26.

It is noted that, failing a Duplicate MAC ID does not effect the output line 28*b*. It may still be pulled low, enabling a neighbor module. In unconfigured mode, however, if the module fails Duplicate MAC ID (e.g., someone else owns Node 63), the output line 28*b* may be held high.

After performing one of the above processes, a module may become an 'on-line module' and may operate on the PointBus 26. If the input line 28*a* suddenly is asserted, a module's response may be to reflect the state on the output 28*b*. Likewise, if the input line 28*a* goes low, a module's response may be to pull the output line 28*b* low.

Figure 3:
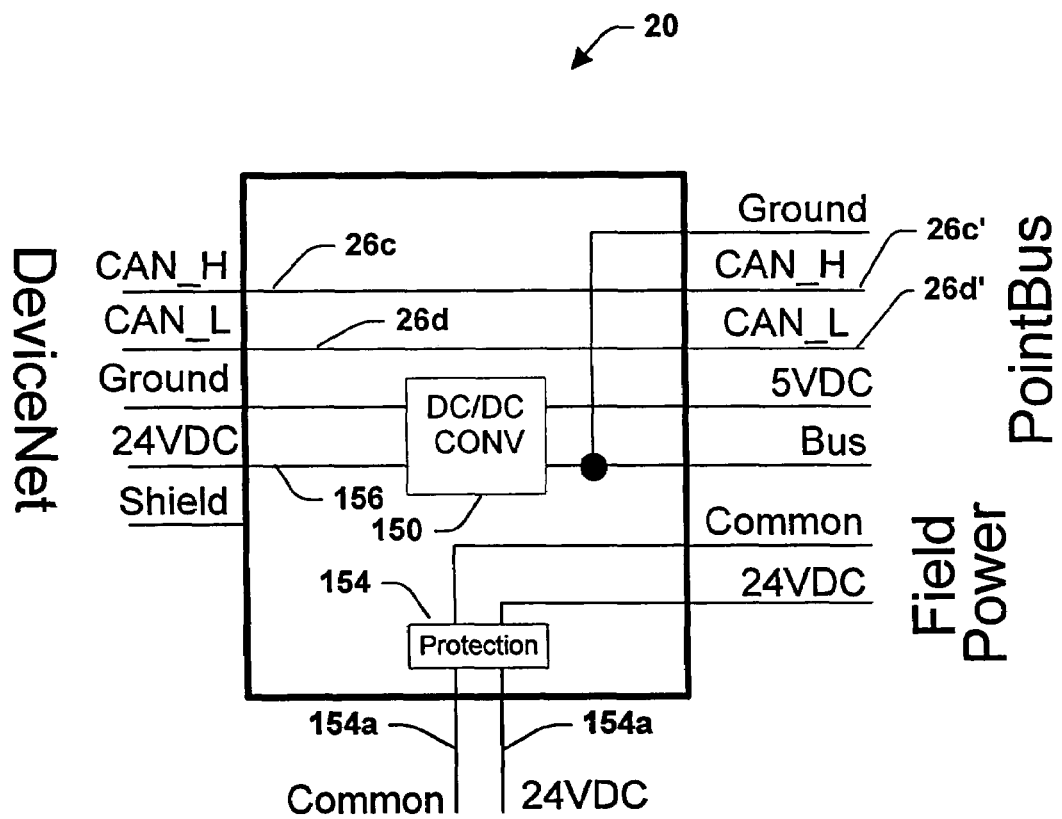
FIG. 3 is a schematic block diagram illustrating a pass-thru interface for an adaptable control system in accordance with one aspect of the present invention.

Turning now to FIG. 3, the interface 20, as illustrated in FIG. 1, in accordance with a particular aspect of the present invention is depicted. The interface 20 essentially performs a pass-thru of the network 24 and further provides an economical interface in accordance with the present invention. For example, the interface 20 may operate as a DeviceNet physical media converter. DeviceNet (e.g., round wire media) may be connected to a side of the interface 20 and PointBus connections (e.g., CAN lines—26*c*', 26*d*') are made on the other side. A DC/DC converter is provided to produce 5 volts for the I/O modules. The interface 20 may also include a power monitor function (within the DC/DC converter 150) and a power protection function 154 along with the DC/DC converter 150.

In accordance with the power monitor function, described above, the interface 20 may monitor a DeviceNet 24 VDC line 156—if it drops below about 10 VDC, the DC/DC converter 150 may be turned off. Thus, if DeviceNet power 156 goes down, I/O modules are precluded from communicating over an invalid network.

In accordance with the power protection function 154, described above, the interface 20 may be protected from reverse wiring at field power terminals 154a and 154b. It is noted that the input voltage to the DC/DC converter is about 10 to 28.8 VDC, and the output may be regulated at about 5 VDC and 1 A.

I/O modules may be addressed by the interface 20 similar to DeviceNet modules. A master (not shown) may assign each of module an address and provide configuration data. As shown, the interface 20 pulls the bus line 28 low. This will enable the first I/O module (e.g., to the right of the interface 20) to go on the DeviceNet network. If the module next to the interface 20 is already commissioned with a network ID, that module will pull its bus line 28 low. Therefore, in a configured system, each module may serially attach to the network, one-at-a-time, starting with the module next to the interface 20.

If each module is 'new' (node addresses are set to 63), then the interface 20 will enable the first module. The first module may then broadcast its Duplicate MAC ID message (node 63) and wait for the message to be changed before enabling a neighbor module. Consequently, in an unconfigured system, a single module may be on the network at node 63 at one time.

Figure 4:
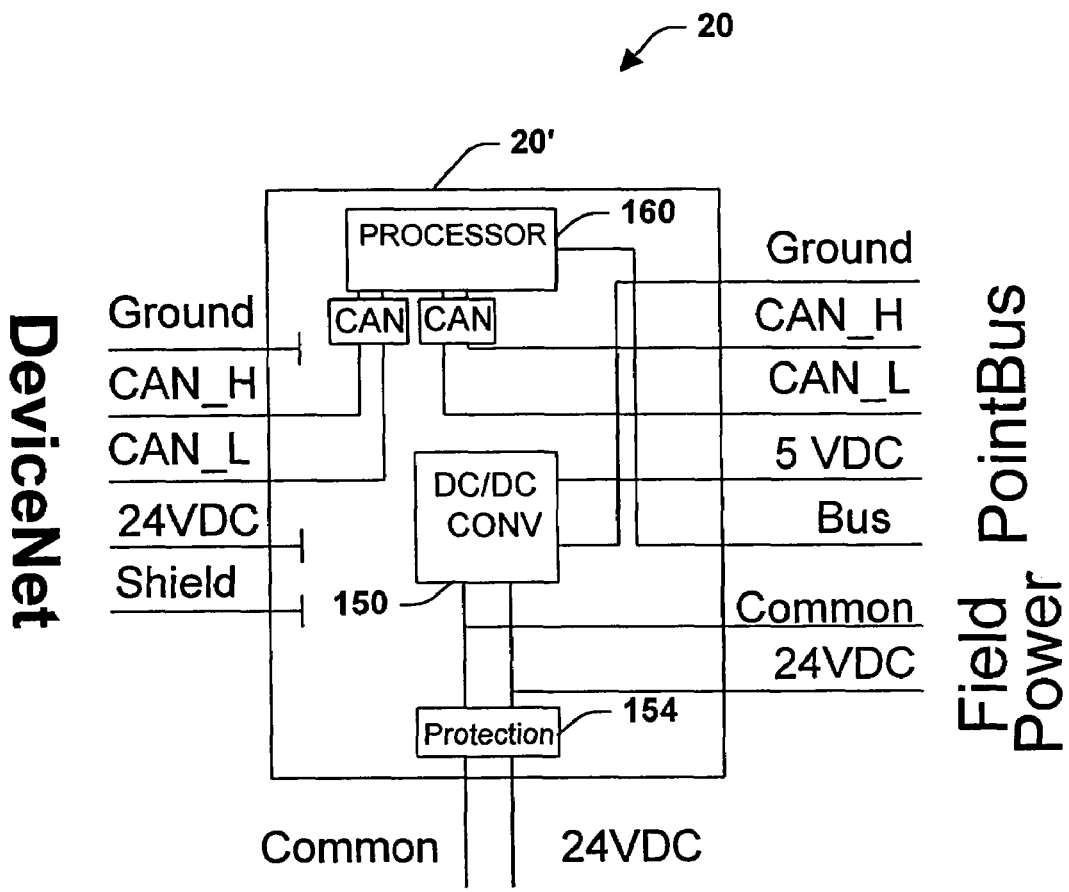
FIG. 4 is a schematic block diagram illustrating an adapter interface for an adaptable control system in accordance with one aspect of the present invention.

Now referring to FIG. 4, an alternative aspect for the interface 20 is depicted. The interface 20 may function as an adapter 20' and enables I/O modules to be presented to a host DeviceNet network as a single Node. As described above, the adapter 20' may also include a power monitor function (within the DC/DC converter 150) and a power protection function 154 along with the DC/DC converter 150. Furthermore, the adapter 20' may include a processor 160 for buffering data from the Device network and presenting the data to the I/O modules as described below.

Figure 5A:
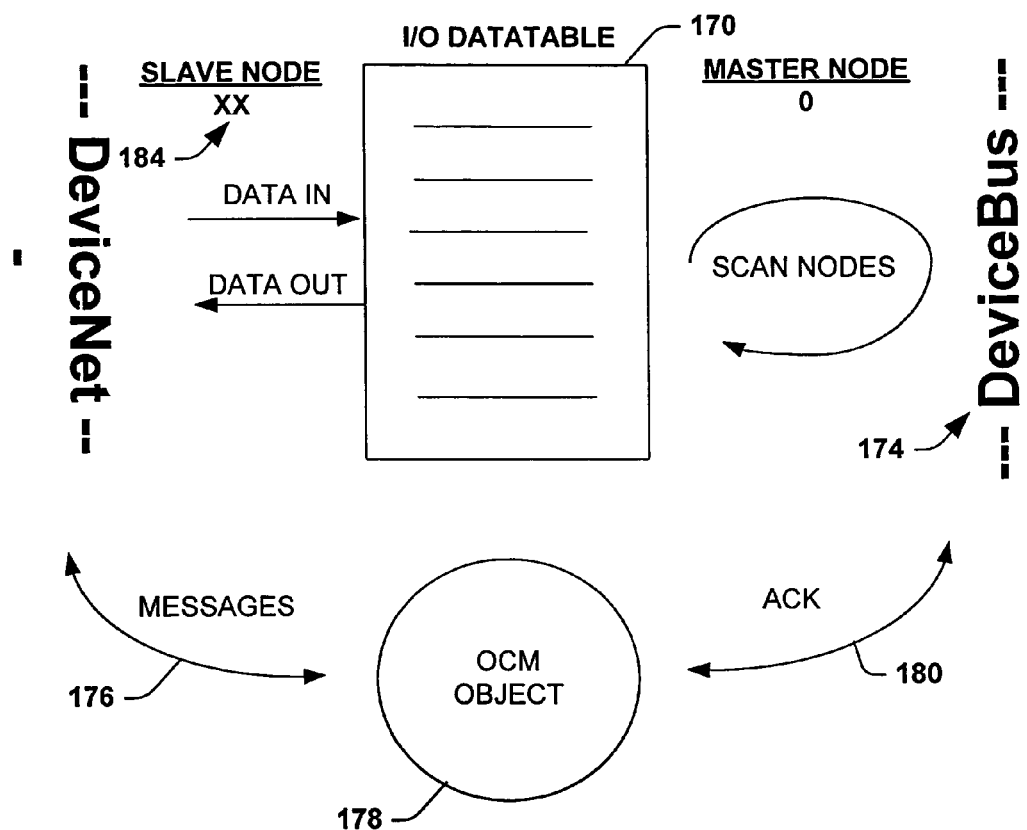
FIG. 5a is a schematic block diagram illustrating an adapter interface operation for an adaptable control system in accordance with one aspect of the present invention.

Referring now to FIG. 5a, a schematic block diagram illustrates the adapter 20' operation in accordance with one particular aspect of the present invention. The adapter 20' may act as an I/O scanner, pass unconnected messages (not shown) to the I/O modules and collect I/O data in a table 170. When a host (not shown) desires to send configuration data to a node on the PointBus side (shown as DeviceBus 174) of the adapter 20', the host may send a message 176 to an Offlink Connection Manager (OCM) Object 178. The object may reformat the message 176 and pass it on to the I/O modules. Additionally, the adapter 20' may queue up the messages 176 and keep track of time outs (not shown) and acknowledgements 180.

The adapter 20', when acting as a master, creates a node list 184 of all the slaves on the PointBus network. A user may prefer to have the node list 184 organized by physical location (e.g., the first node in the list is next to the adapter 20', the second is next to the first, and so on). To make the node list 184, the adapter 20' will utilize the bus line 28 described above.

Figure 5B:
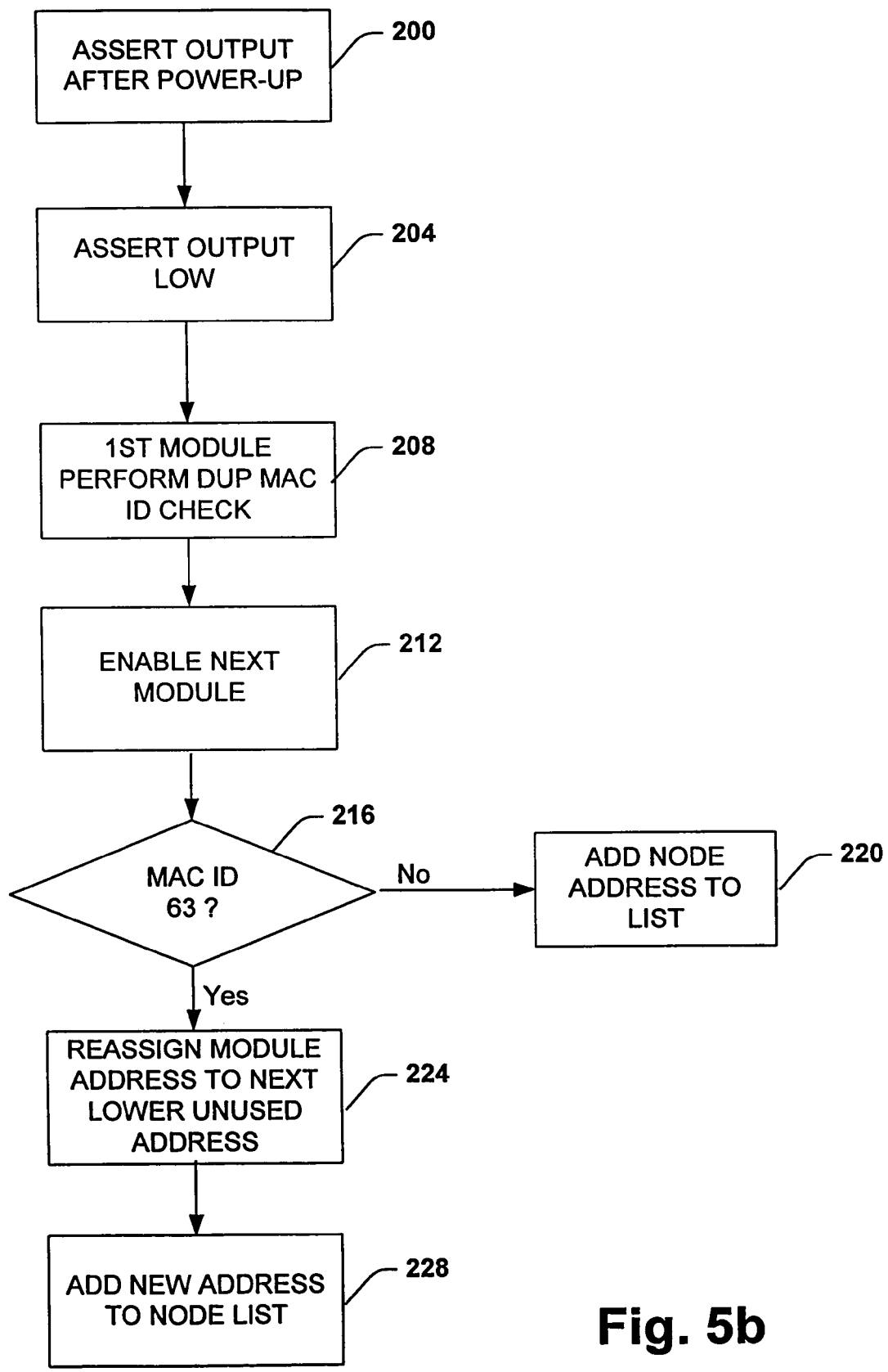
FIG. 5b is a flow chart diagram illustrating a methodology for an adapter operation in accordance with one aspect of the present invention.

Turing now to FIG. 5b, an exemplary process for compiling the node list 184 is provided.

At step 100, the adapter 20' asserts its output line 28b within about 300 ms after power is applied. The adapter 20' then begins to detect I/O modules at step 204. At step 204, the adapter 20' may pull the output line 28b low. At step 208, the first module next to the adapter 20' may begin its Duplicate MAC ID Check. When a module starts its MAC ID check, it will pull its output line 28b low enabling the next module to start its Duplicate MAC ID check at step 212.

At step 216, if the MAC ID of the first module is not, for example, 63 then the node address will be added to the Node List 184 at step 220. It is noted, if another module announces that an address has been taken, the adapter 20' will know that a module exists at that location, but may have an error. If the MAC ID is 63 at step 216, then the address needs to be reassigned at step 224. The adapter 20' may change the module network address to the next lowest unused address. At step 228, the new address is added to the Node List 184. The process continues to build the Node List 184 as described above until 'all is quiet' (no Duplicate MAC ID Checks) for about 2 seconds.

The node lists 184 that are created describe which I/O modules are connected to the adapter 20' and is generally in the order—based on physical distance from the adapter 20'.

After the node list 184 has been constructed, if the adapter 20' hears another Duplicate MAC ID check, it may then add this node to the bottom of an unordered DeviceNet Node List (not shown).

Figure 6:
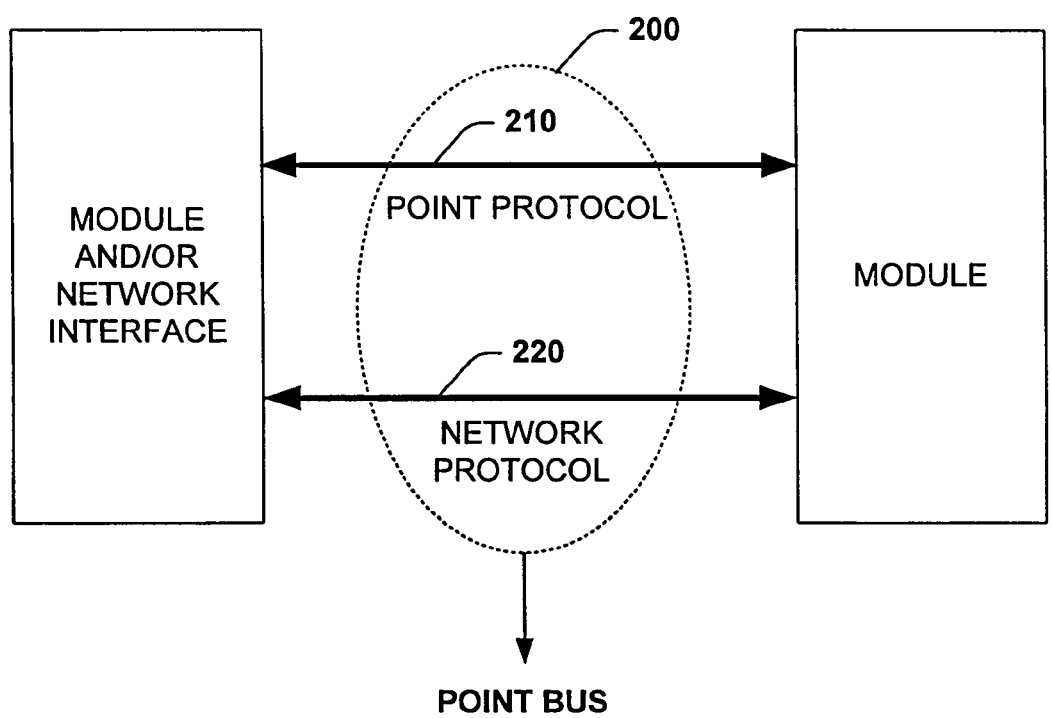
FIG. 6 is a schematic block diagram illustrating a protocol for an adaptable control system in accordance with one other aspect of the present invention.

Referring now to FIG. 6, a PointBus 200 is described in accordance with an aspect of the present invention. The PointBus 200 describes an architecture wherein a point protocol 210 is generally is provided to facilitate standard network communications via a sequentially ordered enablement process, as described above. A second protocol 220, such as a DeviceNet protocol may be employed for network communications, for example, and is described below in accordance with one particular aspect of the present invention. It is to be appreciated, however, that other communications networks may be employed as described above.

In accordance with a DeviceNet protocol, for example, which is well understood in the art, the following attributes, services, and instance attributes may be employed to provide a network protocol 220 to associated I/O modules.

Class Attributes: May include the following DeviceNet definitions.

| Num | Implementation | Access Rule | Name | DeviceNet Data Type | Description | Semantics of Values |
|---|---|---|---|---|---|---|
| 1 | Required | Get | Revision | USINT | Revision of this object. | The current value assigned to this attribute is two. If updates that require an increase in this value are made, then the value of this attribute may increase by one. |

Class Services: May include the following DeviceNet definitions.

| Service Code | Implementation | Service Name | Service Description |
|---|---|---|---|
| 0E $_{hex}$ | Required | Get_Attribute_Single | Used to read a PointBus Class attribute value. This service may be required to be supported if any of the PointBus Class attributes are supported. |

Instance Attributes: May include the following DeviceNet definitions.

| ID | Implementation | Access Rule | Name | DeviceNet Data Type | Description | Semantics of Values |
|---|---|---|---|---|---|---|
| 0x01 | Required | Set | DupMAC Request | BOOL | Modules sequently transmit single DupMAC request message. | See "Semantics" section |
| 0x02 | Required | Set | Quick Connect | USBYTE | Set Quick Connect option for multiple nodes. | See "Semantics" section |
| 0x03 | Conditional[2] | Set | IO Module Auto-Address | BOOL | Automatically re-address neighboring PointIO modules. | See "Semantics" section |
| 0x04 | Conditional[1] | Set | Adapter Auto-Address | USBYTE | Automatically re-address neighboring PointIO modules. | See "Semantics" section |
| 0x05 | Required | Set | Baud Rate | USBYTE | Set baud rate for multiple nodes. | See "Semantics" section |
| 0x06 | Required | Set | Auto Baud Disable | USBYTE | Set Autobaud mode for multiple nodes. | See "Semantics" section |
| 0x07 | Conditional[1] | Get | Physical Order List | SHORT_STRING | Current list of nodes attached to ADN, ordered by physical location. | See "Semantics" section |
| 0x08 | Conditional[1] | Get | Physical List Acquire Status | USBYTE | Status of last physically ordered list acquisition started by ADN. | See "Semantics" section |
| 0x09 | Conditional[1] | Get | Physical Order Failed Node | USBYTE | MACID of first failure in system. | See "Semantics" section |
| 0x0A | Conditional[2] | Get | GMM_Config_1 Assembly | SHORT_STRING | Configuration Assembly for Generic Master Mode. | See "Semantics" section |
| 0x0B | Conditional[2] | Get | GMM Channel Status | STRING/BYTE | Generic Master can collect channel status | See "Semantics" section |
| 0xEE | Optional | Set | Reset EEPROM | BOOL | Neighboring module's EEPROM is reset | See "Semantics" section must be in power-up fail |

[1]Attributes 4, 7, 8 and 9 may be supported by Adapter modules.
[2]Attributes 3 and 10 may be supported by I/O modules.

Below is a semantic definition from the table provided above.

DupMAC Request (Attribute 1)

Values of 0 or 1 are valid for the SET_SINGLE service. A value of 0 results in no action taken by the node. A value of 1 causes a DupMAC Request Message to be transmitted before a 16-bit value is transmitted on the bus line 28 to the next 10 module. This feature may be utilized to determine the ordering of nodes currently present on the PointBus 26.

A value of 0 is returned by I/O modules for GET_SINGLE requests.

| Data | Action |
|---|---|
| 0 | Do Nothing |
| 1 | Transmit DupMAC Request Message - broadcast |

Quick Connect (Attribute 2)

Values of 0, 1, or 2 are valid for the SET_SINGLE service. A value of 0 results in no action taken by the module. A value of 2 enables the Quick Connect feature for the receiving node and nodes to the right of the module, while a value of 1 disables the feature.

| Data | Action |
|---|---|
| 0 | Do Nothing |
| 1 | Disable Quick Connect - broadcast |
| 2 | Enable Quick Connect - broadcast |

A value of 0 is returned by I/O modules for GET_SINGLE requests.

I/O Module Autoaddress (Attribute 3)

Values of 0 or 1 are valid for the SET_SINGLE service. If the module has I/O connections allocated that are not in the IDLE state, an INVALID_SERVICE_FOR_OBJECT_STATE error message is returned. A value of 0 results in no action taken by the node. A value of 1 causes a 16-bit value to be transmitted on the bus line 28 to the next IO module. Within the 16-bit value is a field indicating the sender's MAC ID plus one. The receiving module may then change its MAC ID to be that which was received, and then inform its neighbor of its new MAC ID, before resetting itself.

A value of 0 is returned for GET_SINGLE requests.

Adapter Autoaddress (Attribute 4)

Values of 0 to 63 are valid for the SET_SINGLE service. If an Adapter has PointBus I/O connections allocated that are not in the IDLE state, an INVALID_SERVICE_FOR_OBJECT_STATE error message is returned. The received MAC ID value is then transmitted on the bus line 28 to the next I/O module. Within the 16-bit value is a field indicating the sender's MAC ID. The Autoaddressing function propagates itself until the rightmost I/O module has been reached.

A value of 0 is returned for GET_SINGLE requests.

Baud Rate (Attribute 5)

The values for this attribute are different for Adapters and I/O modules: Values of 0 through 3 are valid for SET_SINGLE service for both Adapters and I/O modules. Values 1, 2, and 3 correspond with baud rates 125K, 250K and 500K, respectively. A value of 0 results in no action taken by the node. As with the setting of the DeviceNet Object's BAUD RATE attribute, a module reset does not occur automatically after performing a SET_SINGLE service to this attribute. An additional value of 0xAB may be accepted by the Adapter, representing a baud rate of 1 Megabaud on the PointBus 26. After accepting the value 0xAB, the Adapter may inform the I/O modules to enable autobaud via the bus 28. An I/O module may reject the value 0xAB with the error code INVALID_ATTRIBUTE_VALUE. Although the I/O modules are capable of communicating over CAN lines at 1 Megabaud, due to ODVA compliancy reasons this baud rate may not be directly settable.

| Data | Action |
|---|---|
| 0 | Do Nothing |
| 1 | 125k - broadcast |
| 2 | 250k - broadcast |
| 3 | 500k - broadcast |
| 0xAB | 1M - broadcast (adapters) |

If the module has any I/O connections allocated that are not in the IDLE state, an INVALID_SERVICE_FOR_OBJECT_STATE error message is returned. A value of 0 is returned for GET_SINGLE requests.

Auto Baud Disable (Attribute 6)

Values of 0, 1, or 2 are valid for the SET_SINGLE service. A value of 1 disables the Auto Baud feature for the receiving node and nodes to the right of the receiving node, while a value of 2 enables the feature.

| Data | Action |
|---|---|
| 0 | Do Nothing |
| 1 | Disable Auto Baud |
| 2 | Enable Auto Baud |

A value of 0 is returned for GET_SINGLE requests.

Physical Order List (Attribute 7)

This list represents a user-approved ordering of I/O modules presently defined to be found on a given I/O system. Note that only the order of the modules is represented, not the actual location of each module. The list may be stored in non-volatile memory. After the initial device initialization phase, which occurs after power-up, the Adapter may verify the physical ordering of the present devices.

Physical List Acquire Status (Attribute 8)

The following values may be returned for GET_SINGLE requests:

| Value | Name | Description |
|---|---|---|
| 0 | IDLE | No acquisitions are in process and no list is available. |
| 1 | BUSY | Adapter in process of acquiring a physical order list. |
| 2 | DONE | Adapter is finished acquiring a physical order list. |
| 3 | DONE_FAIL | Adapter finished acquiring list with failed node. |

Physical Order Failed Node (Attribute 9)

This value indicates which physical location has been detected as having a failure. When a failure has been detected, the Adapter may periodically recheck the system until the problem has been corrected. A value of 0xFF indicates that currently no physical ordering failures are observed within the system.

GMM_Config_1_Assembly (Attribute 10)

This attribute provides a method for a non-DeviceNet adapter to configure an I/O module. A block of configuration data sent to the Adapter by its host may be sent along to the I/O module without any knowledge of the contents or format of the data.

GMM Channel Status (Attribute 11)

The data field in the SET_SINGLE request message defines which data is returned in the response. If data field length is zero, the Point Channel Status block is returned. Each bit represents one channel. The message is as long as required to transmit one bit per channel. If a bit is set, an error may exist in that channel.

| | | | | | | | | | | | |
|---|---|---|---|---|---|---|---|---|---|---|---|
| | | | | Unused | | | | 1 | 0 | 2 Channels - 1 byte long |
| | | | Unused | | | 3 | 2 | 1 | 0 | 4 Channels - 1 byte long |
| 7 | 6 | 5 | 4 | 3 | 2 | 1 | 0 | 16 Channels - 2 bytes long |
| 15 | 14 | 13 | 12 | 11 | 10 | 9 | 8 | |

If there is a channel error, this bit will be set. To find the error code for a channel, the adapter may query the Channel Status Word (see below). When the channel status is read, a New Channel Status (NCS) in a Point Status Byte (a byte added to the end of each produced I/O message when in GMM described below) may be cleared until a channel's error status changes.

To obtain the Channel Status Word, the channel number may be included in the data field. The message returned is one word containing the error code for the channel. The word is defined as:

| Bit 7 | Bit 6 | Bit 5 | Bit 4 | Bit 3 | Bit 2 | Bit 1 | Bit 0 |
|---|---|---|---|---|---|---|---|
| Channel Direction | Reserved | | | Channel Number | | | |
| Channel Type | | | | Error Code | | | |

| | | |
|---|---|---|
| Channel Direction | 0 | Output |
| | 1 | Input |
| Channel Type | 001 | 1 bit |
| | 010 | 2 bit |
| | 011 | 4 bit |
| | 100 | 1 byte |
| | 101 | 1 word |

13
-continued

| | 110 | 2 words |
|---|---|---|
| Error Code | 0 | No Error |
| | 1 | Short Circuit |
| | 2 | Under Voltage |
| | 3 | Over Voltage |
| | 4 | Overload |
| | 5 | Over Temperature |
| | 6 | Wire Break |
| | 7 | Upper Limit Exceeded |
| | 8 | Lower Limit Exceeded |
| | 9 | General Error |
| | 10 | Configuration Error |
| | 11-31 | Undefined |

Note:
Attempting to read a CSW that does not exist may result in an error message (object state conflict).

Reset EEPROM (Attribute 0xEE)

When this data field is set to 1(0 may be ignored), the module may send a Reset EEPROM command along the serial line. Only the neighbor module may reset the EEPROM, not the module receiving the message. The neighbor does not re-transmit the Reset EEPROM message along the serial line.

A value of 0 is always returned by a GET_SINGLE request.

1.5 Instance Services

| Service Code | Implementation | Service Name | Service Description |
|---|---|---|---|
| 05 hex | Required | Reset | Used to simulate a power cycle by the received node. Before resetting, the node passes a reset message to its neighbor, which will do likewise. Can be used to reset an entire PointIO system with one DeviceNet/PointBus message.<br>0 = soft reset (or no data field)<br>1 = Out-o-Box Reset |
| 0E hex | Conditional | Get_Attribute_Single | Returns the contents of the specified attribute. |
| 10 hex | Conditional | Set_Attribute_Single | Modifies an attribute. |

The point protocol 210 described above in relation to FIG. 6, will now be described in more detail in accordance with one particular aspect of the present invention. At startup, and after initializing the microprocessor 30, each module sets its output 28b high, the level of which may be read by the next module. After an LED startup sequence is finished (greater than or equal to about 1 second—depending on the module), each module waits until the input pin 28a level goes low. This indicates that the module is now permitted to send out its first DupMAC message (another message may follow about 1 second later). After its first DupMAC message has been transmitted onto DeviceNet, the module then sets its output 28b low, enabling its neighbor to also send DupMAC messages. This process continues until each I/O module has transmitted its first DupMAC message.

If a message is received requesting a configuration change, the module may ignore the request and not propagate it to its neighbor if the module has any I/O connections that are not in an IDLE state. Before initiating a request with the point

14 protocol 210, the user/operator may take steps to ensure that the proper nodes will be able to complete the operation.

The following packet may transmitted in a bitwise fashion over the output pin 28b (e.g., Sync Bit may be transmitted first):

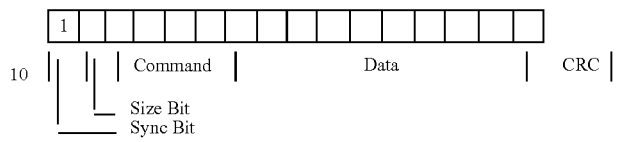

Point Protocol Packet

Explanation of Bit Fields

| | |
|---|---|
| Sync Bit | This bit signals the neighboring module that a command is being transmitted. |
| Size Bit | This bit specifies whether the packet length is 16 or 32 bits in length. A value of 0 indicates a length of 16. Currently no messages requiring a 32-bit packet have been identified. The format of the additional 16 bits is command specific. |
| Command | Command issued. |
| Data | Command-specific data. |
| CRC | 3-bit CRC = inverse of remainder of division of 12-bit quantity of Size/Command/Data fields by 8. |

Bit Transmission Timing

I/O modules may include a 1 ms timer interrupt. Within the associated interrupt service routine (ISR), any transmission or reception of bits via the output 28b and input 28a may occur. As a module's timer ISR may be up to about 1 ms out of phase with its neighbor's, the following process may be implemented.

Each bit may be transmitted 3 times by the ISR, resulting in each bit having about 3 ms on the wire. When a module first detects that a bus packet is being transmitted by its neighbor (by sensing a high level on the input 28a), it may wait for the next interrupt and then begin the process of storing 16 bits received every third interrupt. This substantially guarantees that the value read will be within the middle third of each bit's transmission time. After all 16 bits have been sampled and stored, both the Sync and CRC fields are verified, and the Size bit is checked to determine if 16 additional bits are to be sampled. If all tests pass, the Command and MAC ID fields may then be processed. Bits may be left-shifted onto the bus 28 by the transmitting module. The received (sampled) message may be disqualified and ignored if it fails the CRC test.

The following table indicates the commands currently supported. It is assumed that the Size Bit 0.

Commands Supported

| Command Code | Command Name | Description | Data Field |
|---|---|---|---|
| 0 | Generic Broadcast | Evokes behavior or changes configuration for each module. | 0x00 - Transmit one DupMAC request message.<br>0x01 - Reset. Emulate power cycle. |

-continued

| Command Code | Command Name | Description | Data Field |
|---|---|---|---|
| | | | 0x02 - Baud Rate = 125K<br>0x03 - Baud Rate = 250K<br>0x04 - Baud Rate = 500K<br>0x05 - Turn off Autobaud<br>0x06 - Turn on Autobaud<br>0x07 - Turn off Quick Connect feature.<br>0x08 - Turn on Quick Connect feature.<br>0x09 - Out-o-Box Reset<br>0x10 - Reset EEPROM Checksum |
| 1 | Auto-address | Automatically assign node addresses increasing from left to right. | New MAC ID for PointIO module. Each module must add one to receive MAC ID, and transmit message to its neighbor. |
| 5 | Generic Master Mode | Automatically assign node addresses increasing from left to right, while also causing each module's behavior to change to accommodate a non-DeviceNet adapter. | New MAC ID for PointIO module. Each module must add one to received MAC ID, and transmit message to its neighbor. |

If a message is received requesting a change in MAC ID and/or baud rate behavior, the module may ignore the request and not propagate it to its neighbor if the module has any I/O connections that are not in IDLE state.

Reset EEPROM Checksum

If a module fails power-up (possibly due to an EEPROM Checksum mismatch) the checksum may be re-computed. The message will not be transmitted to the neighbor.

Generic Master (GM) Mode

Generic Master (GM) Mode, which is applicable to I/O modules, enables a group of I/O modules to present I/O data in a uniform format to an adapter. This mode may be utilized when the adapter is providing connectivity to a network that is not a core control network such as DeviceNet and ControlNet. Upon entering this mode, each I/O module may present its I/O data in a consistent fashion, with a final byte of data representing module status information, referred to as the Point Status Byte (PSB). By examining this byte, the adapter may compile status information about the module by reading the GMM Channel Status.

Generic Master Mode may be entered when the SET_SINGLE service for attribute GMM_Config_1_Assembly. In other words, if an I/O module has no configuration data, the adapter may send the SET_SINGLE service for attribute GMM_Config_1_Assembly of the PointBus object.

Upon receiving the Generic Master Mode on the input 28a, each module may execute the following process:

The module begins shifting out an updated Generic Master Mode command to its immediate neighbor.

The MAC ID received in the Generic Master Mode command is compared with the current MAC ID. If it is different, the new MAC ID may be written to non-volatile memory, and the module may be reset after the Generic Master Mode command has been transmitted.

If the module is not already configured for Quick Connect mode, a suitable value may be written to non-volatile memory. A mismatch will not cause a reset for the current power-up sequence.

The current DeviceNet baud rate may be set to 1 Mbaud.

The Autobaud_Disable value in non-volatile storage may reflect that the Autobaud feature is disabled, if not so already.

Upon receiving the SET_SINGLE service for attribute GMM_Config_1_Assembly attribute, each module's application objects may reset all device-specific configurable features before setting those specified in a data portion of the message.

In Generic Master Mode, appended to the end of each produced message may be the Point Status Byte. The PSB is defined as:

| Reserved | NCS | EB |
|---|---|---|

EB    Error Bit
       When set, an error exits.
NCS  New Channel Status
       The bit may be set when a channel's error status has changed.
       Either a new error has been detected or an existing error
       has cleared.
       The bit may be cleared when the Point Channel Status block has
       been read.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer-readable medium having computer-executable components, executing by a computer/processor for Industrial Control module communications, comprising:
   a first data field transmitted through a connector component to facilitate network communications to two or more sequentially connected Input/Output (I/O) modules, the modules are sequentially enabled from an adjacent module, wherein the data field enables each module to initially become configured on the network and subsequently enable a succeeding module to become network operational, the first data field output from the configured module through the connector component enables the succeeding module to become configured on the network, such that a sequential link of the I/O modules is formed; and
   a second data field transmitted through the connector component to transport the network communications to the I/O modules.

2. The computer readable medium of claim 1, the first data field includes an input field to signal the I/O modules are enabled to communicate via the second data field.

3. The computer readable medium of claim 2, the first data field includes an output field to enable an adjoining I/O module to communicate via the second data field.

4. The computer readable medium of claim 1, the first data field includes at least one synchronization bit and at least one data size bit.

5. The computer readable medium of claim 1, the first data field includes at least one of a command field, a data field, and an error checking field.

6. The computer readable medium of claim 5, further comprising a data bit to trigger a timer interrupt for processing communications.

7. The computer readable medium of claim 6 the timer interrupt causes data bits to be transmitted at least three times to provide synchronization between I/O modules.

8. The computer readable medium of claim 5, the command field includes a generic broadcast field that evokes behavior or change configuration for an I/O module.

9. The computer readable medium of claim 5, the command field includes an auto-address field to automatically assign node addresses for an I/O module.

10. The computer readable medium of claim 5, the command field includes a generic master mode field to automatically assign node addresses for an I/O module and to cause the I/O module behavior to change.

11. The computer readable medium of claim 10, the generic master mode field enables a group of I/O modules to present I/O data in a uniform format to an adapter.

12. The computer readable medium of claim 10, the generic master mode field is shifted out as an updated field by an I/O module to a neighboring I/O module.

13. The computer readable medium of claim 10, the generic master mode field causes a communications identifier field to be compared with a current communications identifier field.

14. The computer readable medium of claim 13, the communications identifier field is written to non-volatile memory if determined to be different from the current communications identifier field.

15. The computer readable medium of claim 10, the generic master mode field causes a baud rate to be set for the second data field.

16. The computer readable medium of claim 10, further comprising a field to enable or disable an automatic baud rate feature in the I/O modules.

17. The computer readable medium of claim 10, the generic master mode field is associated with a status byte field having at least one of an error bit and a new channel status bit.

18. A system to facilitate automatic construction of an Input/Output module system in a communications network, comprising:

means to facilitate network communications to enable sequential addressing between at least one adapter and a first Input/Output (I/O) module, the first I/O module configured to enable sequential addressing of a second I/O module, wherein the second I/O module is sequentially connected to the first I/O module, the first module gets configured on the network and an output from the configured module subsequently enables a succeeding module to become configured on the network; and means to transmit network communications between the adapter, the first I/O module and the subsequent I/O modules.

19. A method of automatically forming an Input/Output module group, comprising:

establishing communications between an adapter and a first Input/Output (I/O) module;

sensing at least one other subsequent I/O module sequentially connected to the first I/O module and capable of communicating with the adapter via the first I/O module;

synchronizing communications between the first I/O module and the subsequent I/O module via a first data protocol, wherein the first data protocol enables the first module to get configured on the network and an output from the configured module enables the subsequent module to become configured on the network;

communicating between the first I/O module and the subsequent I/O module via a second data protocol; and automatically coordinating communications between the first data protocol and the second data protocol.

* * * * *